United States Patent

Adams

[15] 3,673,883
[45] July 4, 1972

[54] TOOTHED POWER TRANSMISSION BELT AND METHOD OF MANUFACTURING THE SAME

[72] Inventor: Gerald E. Adams, Mishawaka, Ind.
[73] Assignee: Uniroyal, Inc., New York, N.Y.
[22] Filed: Feb. 3, 1971
[21] Appl. No.: 112,325

[52] U.S. Cl. ..............................74/233, 74/231 C, 156/138, 156/140, 156/142
[51] Int. Cl. ......................F16g 5/16, F16g 1/28, B29h 7/22
[58] Field of Search .....................74/231 C, 232, 233, 234; 156/138, 139, 140, 141, 142

[56] References Cited

UNITED STATES PATENTS

| | | | |
|---|---|---|---|
| 2,838,946 | 6/1958 | Kiekhaefer | 74/232 X |
| 3,338,107 | 8/1967 | Kiekhaefer | 74/231 C |
| 3,566,706 | 3/1971 | Fix | 74/233 |

*Primary Examiner*—Leonard H. Gerin
*Attorney*—Steven H. Bazerman

[57] ABSTRACT

A toothed power transmission belt having teeth distributed on two of the surfaces of the belt and a method of manufacturing the belt are disclosed. The belt is composed of a pair of multi-layered laminations bonded to each other with a reinforcing filament at least partially embedded in one of the laminations. The belt is manufactured by first covering the exterior surface of a longitudinally grooved mandrel with a skin coating of an elastomeric wear and abrasion resistant material. A highly viscous elastomeric tooth filler compound is then applied so as to fill the grooves in the skin coating corresponding to the grooves in the mandrel and cover the entire surface of the skin coating. A reinforcing filament is wound around the mandrel for approximately one-half the width of the covered portion of the mandrel in such a manner as to become at least partly embedded in the filler compound. The portion of the elastomeric materials not having the reinforcing filament encircling it is reversed upon itself and pulled over the reinforcing filament to form the outer toothed surface of the belt. The entire assembly is then cured, stripped from the mandrel and trimmed. If desired, the resulting finished belt slab may be cut into belts of smaller width.

11 Claims, 4 Drawing Figures

PATENTED JUL 4 1972 3,673,883
SHEET 1 OF 2
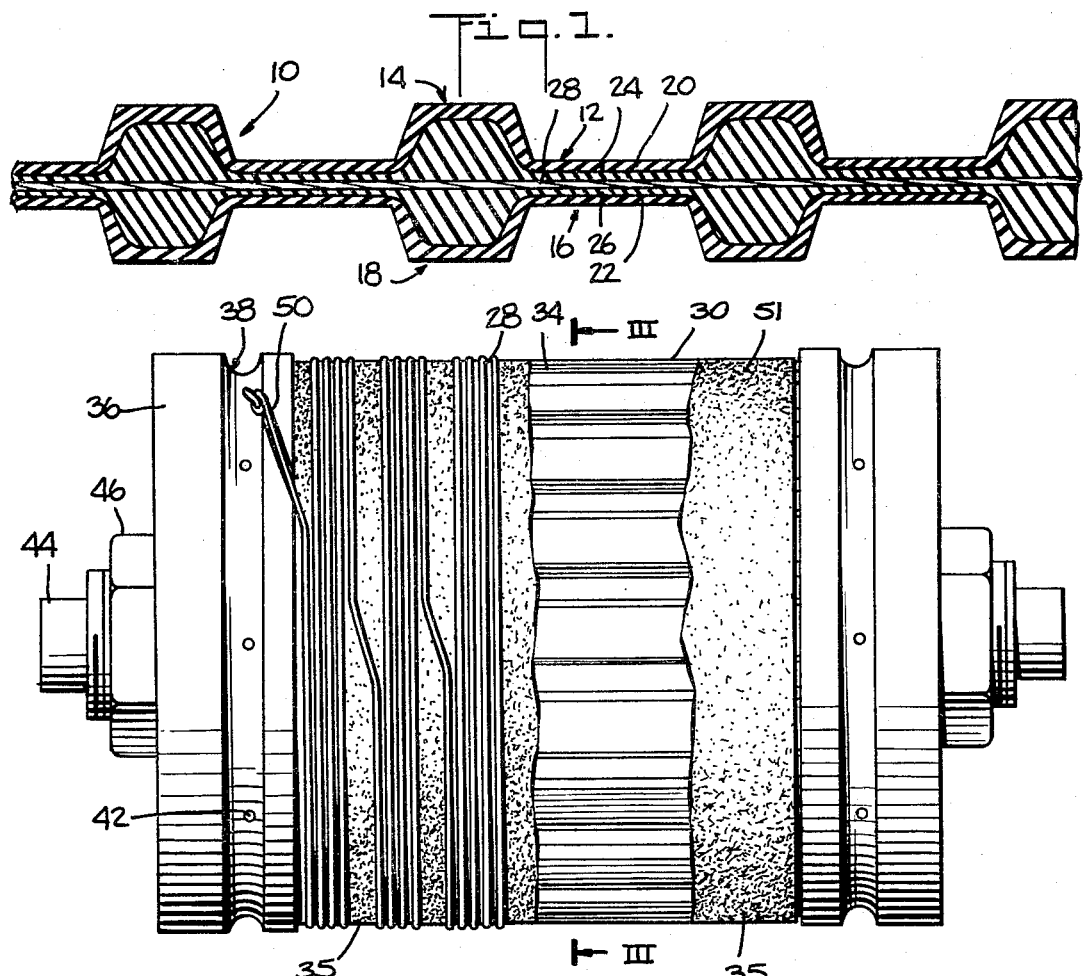
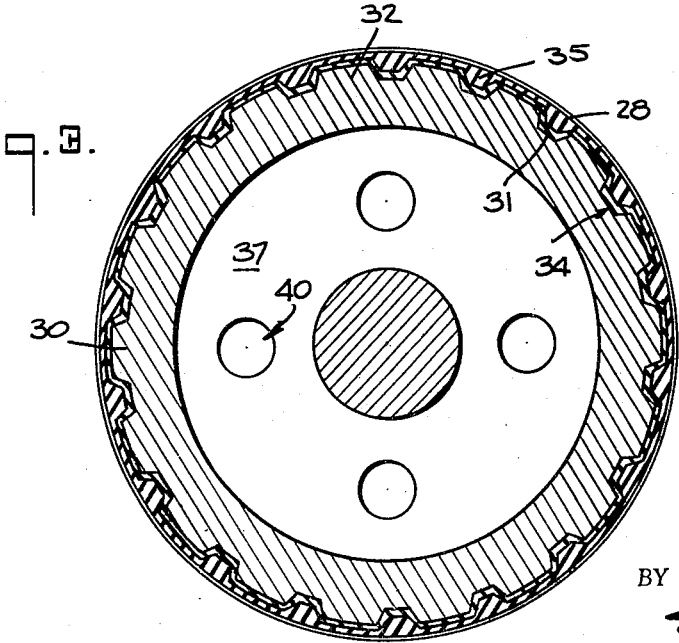
INVENTOR.
GERALD E. ADAMS
BY
Steven H. Bozeman
ATTORNEY INVENTOR.
GERALD E. ADAMS
BY
Steven M. Brennan
ATTORNEY

TOOTHED POWER TRANSMISSION BELT AND METHOD OF MANUFACTURING THE SAME

BACKGROUND OF THE INVENTION

The present invention relates to a toothed power transmission belt which has teeth for power transmission on two of its surfaces and to a method for manufacturing such a belt.

Known power transmission belts which have teeth distributed on opposite sides of a reinforcing cord suffer from serious drawbacks both in their design and manufacture. Normally, such belts are initially manufactured with spaced teeth on only one side of the belt. The layer of rubber on the side of the reinforcing cord opposite the teeth is however slightly wider than a belt tooth. After the belt is fully cured, this thick rubber layer is cut or ground transversely to produce the second toothed surface. Aside from being wasteful, this method requires that the tooth surface on one side be of the same composition as the belt body. Normally, a compound which performs well as a tooth body material does not have the wear resistant characteristics required at the surface of the teeth. Additionally such a system does not allow the bonding of a wear resistant fabric or the like to the outer teeth as a protective layer before curring.

Alternately, conventional endless belts of this type may be manufactured by the use of mold. Such a method requires a complex mold assembly, including an inner and an outer mold which define a mold cavity determining the total configuration of the belt. The inner and outer molds must be precisely psitioned with respect to each other. The use of such an inner and outer molds presents particular difficulty when a reinforcing filament is to be situated within the body of the belt. If in such a method of manufacture the reinforcing filament is wound directly around the inner mold, the filament is necessarily exposed between the teeth on one side of the belt. Due to the filament's direct engagement with the pulley teeth, it becomes rapidly worn. While it is possible to situate the filament between the inner and outer molds without directly engaging the inner mold, this requires the additional positioning of filament suspension members in the molds. Such a system does not centrally locate the reinforcing filament between the lands connecting adjacent teeth or allow the use of reinforcing fabric or the like on both surfaces of the belt. See, for example, U.S. Pat. No. 3,114,598, issued to Beckadolph et al. on Dec. 17, 1963. Additionally, such closed mold systems entrap air during molding forming holes or bubbles in the finished belt.

SUMMARY OF THE INVENTION

It is accordingly a primary object of the present invention to provide a toothed power transmission belt and method for manufacturing the same which will avoid the above drawbacks.

In particular, it is an object of the invention to provide a simple and inexpensive method for manufacturing a power transmission belt having teeth on opposite surfaces.

Also, it is an object of the invention to provide a method of manufacture which can be practiced with the same apparatus which is used for manufacturing a power transmission belt having teeth on only one side and which requires only limited manipulations in addition to those required for manufacturing a belt with teeth on only one side.

Furthermore, it is an object of the invention to provide a belt having teeth on both surfaces wherein a reinforcing cord is centrally positioned between the toothed surfaces and where protective layers on both toothed surfaces insure a long operating life even though the belt is subjected to considerable wear and abrasion.

The belt of the present invention is composed of a pair of multi-layered toothed laminations bonded to each other. A reinforcing filament is at least partially embedded in at least one of the laminations.

According to the method of the present invention, a wear and abrasion resistant elastomeric skin coating is deposited on the surface of a longitudinally grooved mandrel. A highly viscous elastomeric tooth filler compound is then applied filling the grooves in the skin coating corresponding to the mandrel grooves covering the entire surface of the skin coating and extending to a pre-determined depth beyond the skin coating at the lands situated between the grooves. A substantially non-stretchable reinforcing filament is helically wound around the mandrel for approximately one-half the width of the covered portion of the mandrel so as to be at least partly embedded in the filler compound. The unwound portion of the elastomeric materials is thereafter pulled backwardly upon itself over the reinforcing filament to surround the latter. The half of the elastomeric materials which has the reinforcing filament initially wound therearound is bonded to the reversed lamination to form a belt having two laminations with teeth on each of the laminations. After the reversing operation, the entire assembly is cured. The resulting belt is then stripped from the mandrels and the edge where the elastomeric materials were doubled over is trimmed. The resulting belt slab may then be cut into smaller widths if desired.

BRIEF DESCRIPTION OF DRAWINGS

The belt of the invention and the method of manufacturing the same are illustrated by way of example in the accompanying drawings which form part of this application and in which:

FIG. 1 is a fragmentary longitudinal sectional elevation of a belt of the present invention;

FIG. 2 is a longitudinal elevation of a mandrel used in the manufacture of a belt according to the present invention, having an unreversed belt slab mounted thereon shown with portion of the belt slab broken away;

FIG. 3 is a transverse sectional elevation of the mandrel of FIG. 2 and the belt components thereon prior to the reversal operation taken on line I—I.

DESCRIPTION OF PREFERRED EMBODIMENTS

Figure 4:
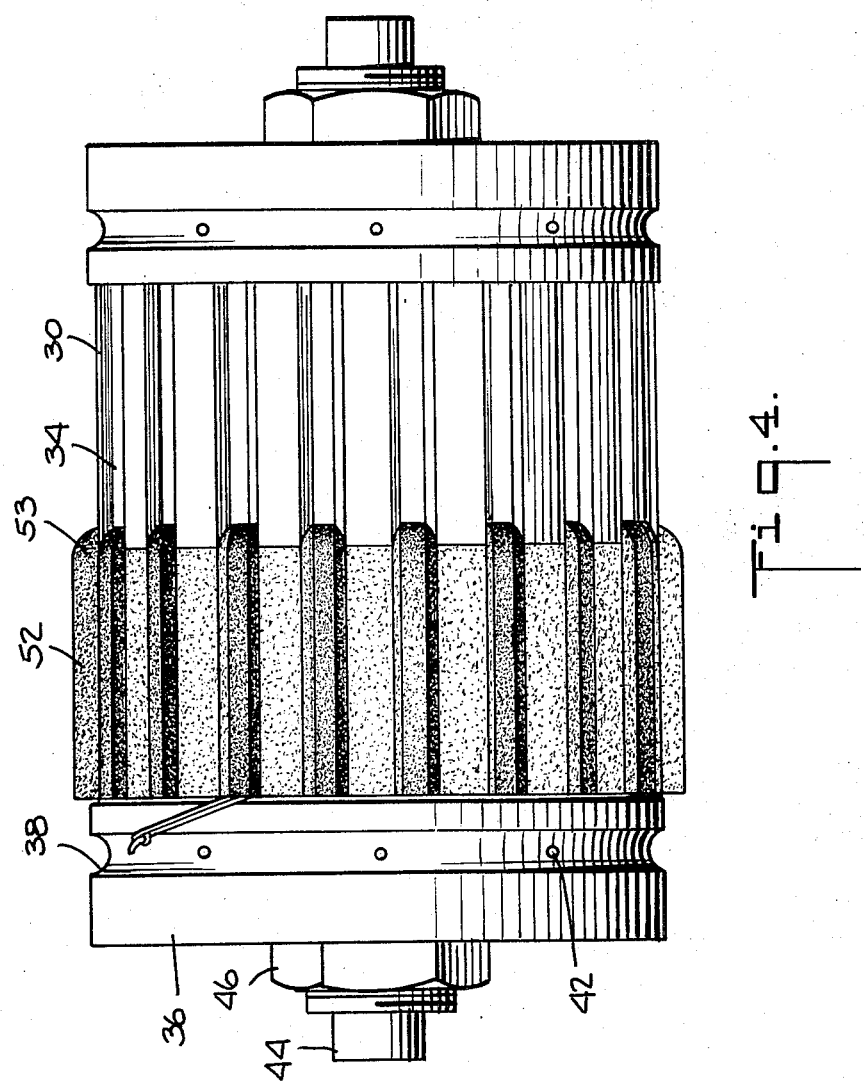
FIG. 4 is a longitudinal elevation of the mandrel and belt slab of FIG. 2 after the belt slab has been reversed on itself.

As can be seen from FIG. 1, where part of an endless belt 10 of the invention is illustrated in a longitudinal section, the belt includes outer laminations 12 & 16 each having transverse teeth 14 & 18, respectively, distributed longitudinally along its length. The laminations 12 and 16 have exterior elastomeric skin coatings 20 and 22 respectively made of a wear and abrasion resistant material. Alternatively, a wear resistant fabric can be used in place of skin coatings 20 and 22. The laminations 12 and 16, respectively, also have interior elastomeric layers 24 and 26, respectively, preferably made of an urethane rubber. Between laminations 12 and 16 a reinforcing filament or cord 28 is helically wound within the belt 10. The reinforcing filament 28 is at least partly embedded in at least one of the layers 24 and 26. This results in the reinforcing cord 28 being situated in a substantially neutral plane midway between the exposed surfaces of the belt 10.

The preferred reinforcing filament 28 is a continuous filament glass yarn impregnated with a suitable rubber such as "Paracril," a butadiene acrylonitrile rubber as described in U.S. Pat. No. 3,287,204 issued to Marzocchi on Nov. 22, 1966 or "Estane," a commercially available thermoplastic polyurethane. Many other reinforcing fibers and filaments can be used, such as Nylon, polyurethane impregnated Dacron, cotton cord, linen cord, silk, wire, jute or rayon.

The skin coating 20 and 22 is positioned at both working surfaces of the belt so as to protect the reinforcing filament 28 and interior elastomeric layers 24 and 26 from direct contact with the gear teeth which would co-act with both surfaces of the belt 10 when in use. This construction insures longer operating life in the resulting belt 10.

The toothed belt 10 of the invention is manufactured on a mandrel 30 shown in longitudinal elevation in FIGS. 2 and 4 and in transverse section in FIG. 3. FIGS. 2, 3 and 4 are shown with a partially completed belt positioned thereon.

The mandrel 30 is of an elongated substantially cylindrical configuration and can be made of any solid, relatively rigid material such as plastic, metal, wood or glass. Mandrel 30 has a substantially cylindrical wall 32 formed with exterior, longitudinally extending grooves 34 distributed about the longitudinal axis of the mandrel. The cylindrical wall 32 is positioned between a pair of end plates 36 which have annular grooves 38. Openings 40 are provided in the end plates 36 and in support member 37 so that air may circulate through the interior of the mandrel 30. Grooves 38 are provided with radial holes 42 forming passageways between the interior and exterior of the mandrel.

A shaft 44 extends through and is fixed to the end plates 36 and is threaded to carry nuts 46 which urge the end plates 36 toward each other in order to tightly hold the mandrel cylinder 32 between the end plates 36. Shaft 44 is adopted for mounting on a suitable machine for winding the reinforcing filament 28 helically around the mandrel in a manner described in greater detail below.

Initially the exterior surface of the mandrel 30 is treated with a release agent. This release agent or mold lubricant has a composition depending primarily upon the material used to form the cylindrical wall 32. Various waxes, silicones, stearates and other common separators can be used successfully.

A coating 31 which will form skin coatings 20 and 22 in the finished belt is then applied to the mandrel so as to cover the entire exterior surface of the cylinder wall 32. A self-curing liquid urethane rubber of high wear and abrasion resistant character is the preferred material for coatings 31. It has been found that a liquid urethane rubber having a molecular weight in the range of 2,000 and which is the reaction product of diisocyanate and a polyalkylene ether glycol has the necessary wear characteristics. The liquid urethane rubber (a prepolymer) should contain a curing agent such as methylenedianiline. Alternatively, conventional two-component urethane spray systems may be used.

The coating 31 is preferable applied by electrostatic spray techniques. The resulting skin coatings 20 and 22 in the finished belt 10 have a variable thickness, the thickest portions being on the bottom and sides of the teeth as illustrated.

The mandrel 30 is then allowed to set for a sufficient time for a partial air curing of coating 31. A high viscosity polyurethane of lower molecular weight is then applied by such means as a squeegee to form a layer 35 which will become the interior layers 24 and 26 of the finished belt 10. This polyurethane can have a suitable preservative added to increase its viscosity. A curing agent can also be added just before the polyurethane is to be applied.

Before the high viscosity layer 35 is cured, the reinforcing filament 28 is helically wound around the cylinder wall 32 of the mandrel for slightly less than one-half the length of the belt slab 51 composed of coating 31 and layer 35. During winding, the reinforcing cord 28 is at least partially pulled into the belt slab 51.

While the method set forth above is preferred, the order of applying layer 35 and the reinforcing filament 28 can be reversed, so that the step of winding the reinforcing filament takes place before depositing of the layer 35. The convolutions of the helically wound reinforcing filament would be spaced from each other so that the layer 35 can be deposited by a squeegee or other suitable means in such a manner that it is forced between the convolutions of the reinforcing filament to completely fill the grooves and surround or extend partly around the filament 28 so that the latter becomes at least partially embedded in the belt slab 51.

As may be seen from FIG. 2, an end of the reinforcing filament 28 is positioned in an inclined groove 50 in one of the end plates 36. The reinforcing filament 28 is fastened to in groove 50 by, for example, knotting one end of the filament 28 so as to engage the outer end of groove 50. The entire mandrel is rotated on a suitable winding machine so as to provide the helical winding shown in FIG. 2. The winding convolutions may be spaced from each other as indicated in FIG. 2 to correspond to separate belts of smaller widths which may be subsequently cut.

At this point it is possible, if desired, to cure the unreversed belt slab 51. If this is done, the reinforcing filament 28 should of course be completely embedded in layer 35. If, as preferred, the belt is not cured at this point, the reinforcing filament 28 should be only partially embedded into the elastomeric layer 35 so as to centrally position the filament 28 in the finished belt.

In either case, the portion of the belt slab 51 which is not surrounded by the wound reinforcing filament 28 is then reversed backwardly upon the rest of the belt slab 51 to form the finished belt slab 52 as seen in FIG. 4. This reversal positions laminations 12 and 16 of the finished belt 10 with respect to the reinforcing filament 28.

In the event that the portions of layer 35 which will become layers 24 and 26 do not slide easily across each other, a cement which also acts as a lubricant until it hardens can be used to facilitate the reversing operation as well as to improve the adhesion between laminations 11 and 16. Such a cement is particularly necessary if the belt slab 52 was cured prior to the reversing operation. The lubricating cement may be applied simultaneously with the reinforcing filament 28.

With the cylindrical wall 32 of the mandrel covered along one-half of its length with the reversed belt slab 52, the entire assembly is subjected to the curing operations to complete the cure of all of the component layers.

After the cured belt slab 52 is removed from the mandrel 30, the curved edge portion 53 of the belt slab 52 where it is reversed on itself is cut away. The slab 52 may then be cut into belts of lesser widths, if so desired.

The following example will serve to illustrate the practice of the invention in more detail.

EXAMPLE

The formulation sprayed to form coating 31 was prepared by admixing two solutions and a wetting agent. The first solution consisted of a polyether polyurethane (approximate molecular weight of 2,000 and sold under the trade name Adiprene L-100) diluted to 50 wt. percent of total solids in methyl ethyl ketone. The second solution consisted of 4,4-methylenedianeline (MDA) diluted with methyl ethyl ketone to 10 wt. percent total solids. Two hundred parts by weight of the first solution were mixed with eighty parts of the second and 0.25 parts of a wetting agent (Silicone SF-1034). Brulin 406-1, a commercial mold lubricant, was applied to the mandrel before coating 31 was applied. The coating 31 was deposited on the mandrel to a thickness which varied between 0.001 to 0.01 inches by use of standard electrostatic spray techniques.

After spraying onto the mandrel, the material was allowed to dry for 15 minutes under ambient room conditions to partially cure the material.

After allowing sufficient time for partial air curing of the coating 31, layer 15, also an urethane composition, was applied. The urethane composition was of high viscosity and consisted of a polyurethane having an approximate molecular weight of 1,300 (trade named Adiprene L-167) combined with a methylene-bis-ortho-chloroaniline in the ratio by weight of one hundred to eighteen.

The reinforcing filament 28, glass fiber impregnated with "-Paracril" was wound across one-half of belt slab 51. The reinforcing filament 22 had an approximate diameter of 0.010 inches and each revolution was spaced from the others by approximately 0.050 inches on center. The reinforcing filament 28 was pulled into the urethane layer 35 to approximately one-half the filament width. To reduce surface friction during the reversing process, and to improve adhesion, a lubricating urethane cement was applied simultaneously with the reinforcing filament 22. The formulations used for this adhesive was a mixture of Adiprene L-167 and Melted Methylene-bisorthochloroanilene in a ratio of 100 to 18 by weight. After reversal, the belt slab was cured for three hours at 200° F.

The resulting belt has each of its toothed surfaces formed from a specifically compounded body material bonded to a surface layer with abrasion resistant characteristics. It also has fewer air bubbles than those formed by using closed mold systems. The accuracy of the positioning of the reinforcing filament results in better strain distribution in the belt. These features cooperate to give the belt of the present invention a longer operating life than conventional belts having teeth on both surfaces.

While the preferred method as disclosed above uses layers of polyurethane rubber to form the belt, other material may be successfully substituted without departing from the spirit of the invention. For example, in place of skin coatings 20 and 22, a stretchable wear resistant fabric may be used. Equally, rubbers, plastics and other appropriate material may be used to form one or more of the layers of the belt. In specialized cases, the protective coating may be eliminated entirely.

While the drawing discloses that mandrel grooves 34 have a uniform cross-section, these cross-sections may be varied in order to produce different tooth cross-sections on the inner and outer surfaces of the resulting belt.

Having thus described my invention, what I claim and desire to protect by Letters Patent is:

1. In a method for manufacturing a toothed belt having teeth on opposite surfaces, the steps of covering the surface of a grooved mandrel with a wear resistant material; covering the wear resistant material and filling the grooves in the wear resistant material corresponding to the mandrel grooves with an elastomeric filler compound to form a belt slab; winding a reinforcing filament around the mandrel for less than one-half the width of the belt slab; reversing the portion of the belt slab which does not have the reinforcing filament wound thereon upon the remaining portion of the belt slab to cover the reinforcing filament; curing the reversed belt slab; and cutting the belt slab into one or more finished belts.

2. A method as recited in claim 1 wherein said reinforcing filament is wound around the mandrel and is in contact with said wear resistant material prior to the filling of the grooves in the wear resistant material with said filler compound.

3. A method as recited in claim 1 wherein the wear resistant material is covered by the filler compound prior to the winding of the reinforcing filament, and said filament when wound around the mandrel is embedded at least partially into the filler compound.

4. A method as recited in claim 1 wherein prior to the reversal of part of the belt slab on itself, the reinforcing filament is completely embedded in the filler compound and the resulting unfinished belt is at least partially cured.

5. A method as recited in claim 1 wherein a lubricating cement is applied to the outer surface of the filler compound just before the belt slab is reversed upon itself.

6. A method as recited in claim 5 wherein the wear resistant material, and filler compound are both at least partially composed of urethane rubber.

7. A method as recited in claim 1 wherein the wear resistant material is a stretchable, elastic fabric.

8. A method as recited in claim 1 wherein the mandrel is covered with a wear resistant material by electrostatically spraying an urethane rubber onto said mandrel.

9. In a method for manufacturing a toothed belt having teeth on two surfaces, the steps of covering the surface of a grooved mandrel with an elastomeric filler compound to form a belt slab; winding a reinforcing filament around the mandrel for less than one-half the width of the belt slab; reversing the belt slab upon itself so that the portion of the belt slab which does not have the reinforcing filament wound thereon covers the reinforcing filament; curing the belt slab; and cutting the reversed and cured belt slab into one or more finished belts.

10. A toothed belt having inner and outer teeth distributed therealong, composed of an inner and outer lamination bonded to each other and a substantially nonstretchable reinforcing filament at least partially embedded in one of the laminations at the region adjoining the other of the said laminations, and wherein each of said laminations is composed of an interior elastomeric body and an exterior layer of wear and abrasion resistant material.

11. A toothed belt according to claim 9 wherein the interior elastomeric body and the exterior layer which compose each lamination are of a different polyurethane rubbers.

* * * * *